July 16, 1957  C. W. RAETZSCH  2,799,643
ELECTROLYTIC CELL

Filed April 9, 1954  3 Sheets-Sheet 1

INVENTOR.
CARL W. RAETZSCH
BY Oscar L. Spencer
ATTORNEY

INVENTOR.
CARL W. RAETZSCH

July 16, 1957  C. W. RAETZSCH  2,799,643
ELECTROLYTIC CELL
Filed April 9, 1954  3 Sheets-Sheet 3
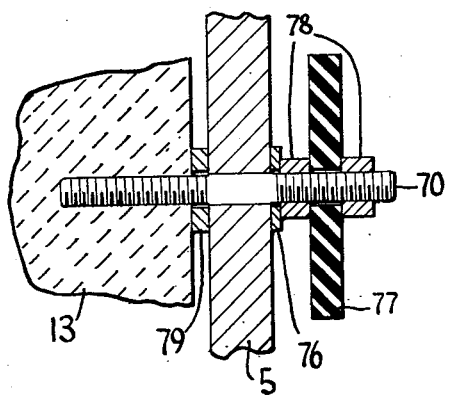
FIG. 5
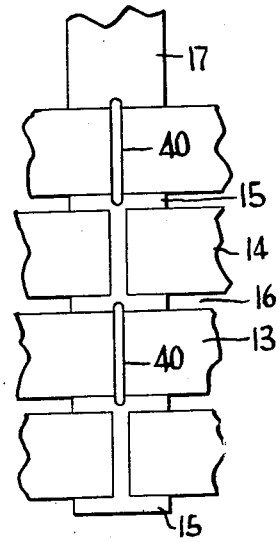
FIG. 6
FIG. 7
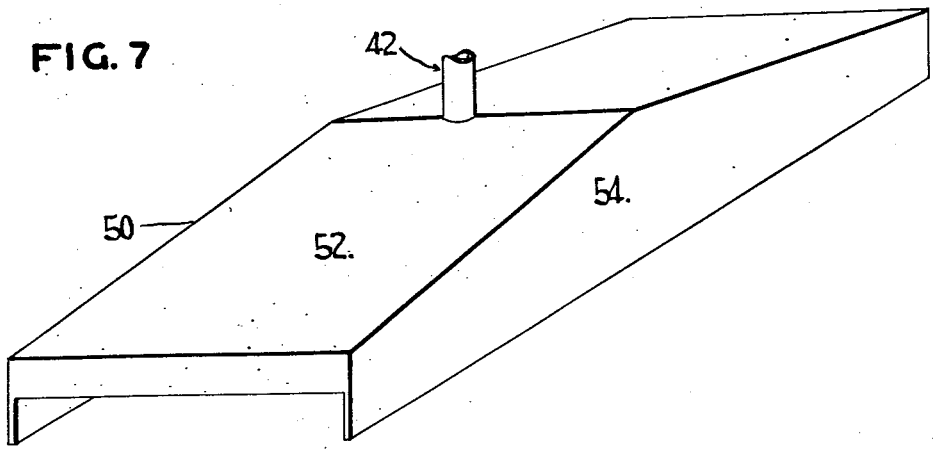
INVENTOR.
CARL W. RAETZSCH
BY
Oscar L. Spencer
ATTORNEY

United States Patent Office 2,799,643
Patented July 16, 1957

2,799,643

ELECTROLYTIC CELL

Carl W. Raetzsch, Corpus Christi, Tex., assignor to Columbia-Southern Chemical Corporation, Allegheny County, Pa., a corporation of Delaware Application April 9, 1954, Serial No. 422,095

10 Claims. (Cl. 204—270)

This invention relates to a novel type of electrolytic cell which is particularly useful for the production of alkali metal chlorate. It is known that alkali metal chlorate may be produced by electrolysis of an aqueous solution of alkali metal chloride. In this process, elemental chlorine is evolved at one electrode and alkali metal hydroxide at the other. However, since there exists no diaphragm between the electrodes, these reagents react together to form chlorate.

According to this invention, a novel cell suitable for use in this and other processes has been provided. This cell has the advantage of being unusually compact, requiring much less space than cells used prior to this invention. Furthermore, the cell is capable of operating at high efficiencies and produces alkali metal chlorate and like materials at low cost. In addition, cells of high capacity can be constructed according to this invention with a minimum of electrical connections.

The invention will be fully understood by reference to the ensuing description when considered together with the accompanying drawings in which:

Fig. 5 is a detail showing the manner in which electrodes are supported on the end walls of the cell illustrated in Figs 2 to 4;

Fig. 6 is an enlarged fragmentary plan view of a portion of the cell; and

Fig. 7 is a perspective view of a hood which may be used in such a cell.

Figure 1:
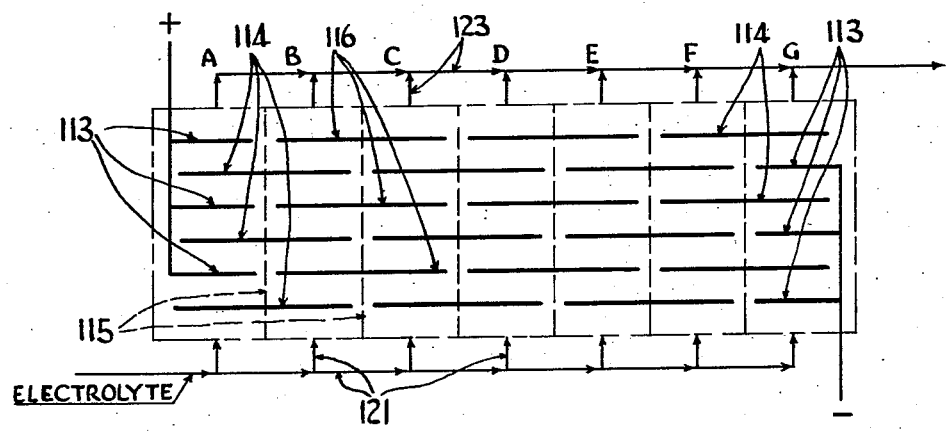
Fig. 1 is a diagrammatic plan view illustrating an embodiment of this invention.

Fig. 1 diagrammatically illustrates the electrode alignment contemplated by the present invention. As shown therein, a plurality of cell units A, B, C, D, E, F, and G are provided. In each of the end cells there are a plurality of short spaced electrodes 113. A further group of longer spaced electrodes 114 are interleaved between the electrodes 113 and spaced therefrom to provide spaces for electrolyte. Electrodes 114 extend across a pair of cell units, for example, A and B. Further groups of electrodes 116 are interleaved with electrodes 114 and extend beyond electrodes 114 into the next adjacent cell.

Insulating barriers 115 are provided for limiting or even preventing current flow through the electrolyte from one cell to the other. Hence, when an electrical potential is applied between opposite electrodes in the opposite ends of the cell, current flows through the electrolyte, for example, from electrodes 113 to electrodes 114 and thence from cell unit A to unit B through electrodes 114. Likewise, in cell unit B, current in such a case flows from electrodes 114 to electrodes 116, then into unit C, and so on to the end of the cell. Electrolyte is circulated through each of the cell units, entering at 121 and exiting at 123.

Cells having the above electrode alignment are capable of being used for many purposes. They are especially valuable for electrolysis of alkali metal chloride solutions, particularly for production of alkali metal chlorate. A typical cell for such purpose is illustrated in Figs. 2 to 7.

As shown in the drawings, the cell comprises a tank 1 having mounted therein an electrode assemblage 2. Tank 1 comprises bottom 3 and side walls 7 constructed of steel coated with a nonconductor, such as rubber or polymerized vinylidene chloride, and nonconducting end walls 5 which may be made of any corrosion resistant material having substantial strength and rigidity, such as polyvinyl chloride, hard rubber, or metal having a nonconducting coating such as rubber on the interior face. The bottom, sides, and ends are fastened together to provide a tightly joined, leak-proof chamber which is open at the top.

Supports 19 of ceramic or like nonconducting material extend laterally across the bottom of the cell from side to side. These supports serve to hold the electrodes above the bottom of the cell and to provide a space 20 below the electrodes for collection of sludge. They also divide the bottom area 20 into sections which are essentially isolated from each other.

A group of parallel carbon electrodes 13 extend from the end 5 of the cell and rest on supports 19. These electrodes are anchored to the end of the cell by electrically conducting studs which extend through the end wall 5 and are threadedly embedded in the carbon electrodes (see Fig. 5). These studs also are connected to suitable copper bus bars on the exterior side of the end wall which in turn are connected to a source of electric potential.

The carbon electrodes each are rectangular carbon slabs, usually one or more inches in thickness. As shown in the drawing, each electrode may comprise two or more strips in edge to edge contact, one upon the other, or the electrode may be integral.

Figure 2:
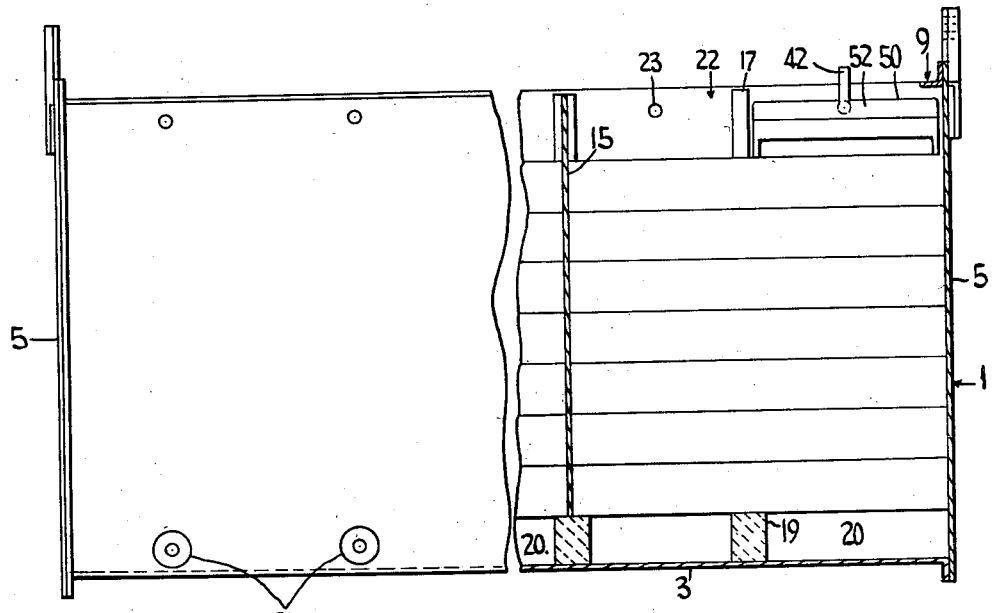
Fig. 2 is a side elevation partially in section along line 2 shown in Fig. 3, drawn substantially to scale, illustrating a cell constructed according to this invention for use in production of alkali metal chlorate.
Figure 3:
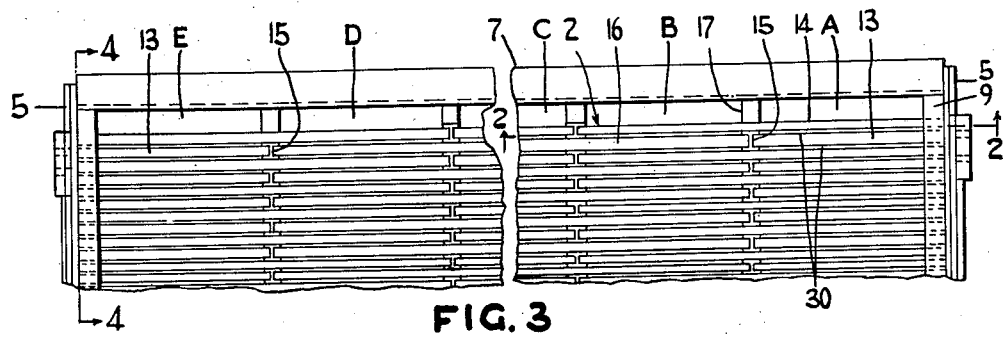
Fig. 3 is a plan view of the cell shown in Fig. 1.
Figure 4:
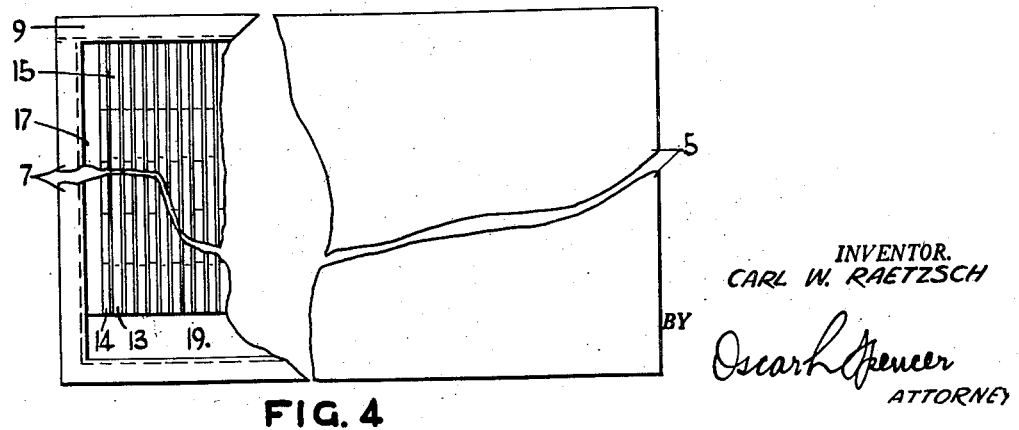
Fig. 4 is an end view, with the end wall partially broken away to show the ends of the electrodes, of the cell shown in Fig. 1.

At the end of each electrode 13, an H-shaped nonconducting spacer 15 of polymerized vinylidene chloride or like material is mounted (see Fig. 2). The groove on one side of this spacer engages the end of the electrode and also the sides thereof for a short distance, and the spacer extends upwardly from the support 19 to the top of the tank. The engagement of the spacer is tight enough to afford firm lateral support for the electrode 13.

A further group of spaced electrodes 16 are similarly mounted vertically in the opposite groove of the spacers 15 in end to end relationship to the electrodes 13. Electrodes 16 are substantially longer, usually twice as long as electrodes 13, but are otherwise of the same general composition and configuration. As shown in the drawing, the electrodes 16 comprise seven carbon strips stacked edge to edge. By building up the electrodes in such stacked strips or blades, construction problems are simplified because of the light weight of the blades. These electrodes also rest on supports 19 and are provided with similar nonconducting removable spacers 15 at the opposite ends.

Pluralities of these electrodes 16 extend in end to end relationship (each separated and supported by spacers 15) toward the opposite end of the cell, finally engaging the end spacer which in turn engages and supports a second group of shorter electrodes 13. Such shorter electrodes are mounted on the opposite end wall 5 and are connected to an electric potential by means of studs, as described above. Thus, a continuous line of electrode segments, each electrically insulated from the other by spacers 15, extends from one end wall to the other and the shorter end segments 13 (which usually are only half as long as the other segments 16) are connected through the end walls to opposite poles of an electrical potential source.

Further vertically mounted electrodes 14 of the same character and configuration as electrodes 16 are dispersed centrally in each of the spaces between the electrodes 13 and 16 and rest upon supports 19. Additional electrodes of the same type are provided along the outer sides of electrodes 13 and 16 (see Fig. 2). Electrodes 14 have a length approximately equal to those of electrodes 16. Thus, the first group of electrodes 14 have their side faces opposed to the sides of electrodes 13 and extend well beyond the ends thereof to provide space for electrolyte opposite a portion of the faces of electrodes 16.

Each of the electrodes has spacers 15 on the ends thereof and thus a continuous line of electrode segments 14 extend from one end of the cell to the other and are separated by vertically disposed spacers 15. Each of these segments overlaps the segments in the line of electrodes 13 and 16.

For best construction, sides of the lines of electrodes 14 bear against the outer sides of spacers 15 which separate the segments in the lines of electrodes 13 and 16 and, in like manner, the sides of the lines of electrodes 13 and 16 bear against the outer sides of spacers 15 in the lines of electrodes 14. Consequently, the spaces 30 between the electrodes 14 on the one hand and the electrodes 13 and 16 on the other are interrupted by the side separator sections of spacers 15, thereby providing a plurality of cell units A, B, C, D and E. It will be understood that the cell may comprise any suitable number of such cell units.

The assemblage of electrodes is supported laterally by vertically extending spacers 17 which wedge the electrode assemblage 2 in place and hold it spaced from the side walls 7 of the cell. These spacers extend from the bottom to the top of the cell, thus effectively dividing the area outside the electrode. Since all of the supports, spacers, and elements are held together by frictional engagement, any electrode segment can be removed readily without disturbing the other parts thereof.

Inlets 21 for introducing electrolyte are provided in the lower section 20 below each of the cell units. An area 22 is provided above the electrodes for collection of electrolyte containing evolved chlorate, chlorine, hypochlorite, and electrolyte outlets 23 are disposed above each cell unit in area 22.

In order to prevent or minimize current flow from one cell unit to the other through the electrolyte in area 22, nonconducting partitions may be provided above the electrodes. As shown in Fig. 6, the spacers 15 are slotted above the top of the carbon electrodes and insulating barrier strips 40 of polyvinyl chloride or like material are disposed in the slots. These strips extend from the top of the electrodes to or above the level of the electrolyte. Similarly, spacers 17 opposite spacers 15 are grooved and support partitions above the electrode level. Alternatively, the spacers 15 may be terminated at the upper edge of the graphite and a partition which extends entirely across the cell may be provided.

Fig. 5 illustrates a convenient means for supplying current to the end electrodes. As shown therein, a copper or like metal stud 70 is threaded into an electrode 13 (illustrated in fragmentary view) and extends through end wall 5 and is anchored firmly in place by means of copper nut 78 which is screwed firmly in place against a metal bearing washer 76. A copper bus bar 77 connected to a suitable power source is held in place on the stud 70 by copper nut 78. While only one stud is shown, it will be apparent that a plurality of such studs may be and usually are used for this purpose. A non-conducting washer 79 of polymerized vinylidene chloride or like material is disposed between cell wall 5 and the end of the electrode 13.

In the operation of the cell, an aqueous solution containing 100 to 150 grams per liter of sodium chloride or equivalent alkali metal chloride and about 3 grams per liter of sodium dichromate is introduced into the cell up to the level of the outlets 23. An electric potential, usually a direct current potential, is established between the groups of end electrodes 13, and electrolysis begins to generate chlorate.

As the electrolysis proceeds, the electrolyte is circulated through the cell continuously by feeding electrolyte into the cell through inlets 21 and withdrawing it through outlets 23. The outgoing electrolyte flows to a cooler to remove heat and thence to a tank (not shown) having a volume approximately twice that of all the spaces between the electrodes. Reaction proceeds in this tank with consequent production of chlorate. Circulation from the tank to the cell is continued until the chlorate concentration builds up to a suitable value, for example, 500 grams per liter. Thereafter, a portion of the circulating liquor is bled off and fresh sodium chloride solution is fed to the circulating liquor. Sodium dichromate and hydrochloric acid are added continuously or intermittently to the circulating liquor.

Hydrogen and oxygen which are evolved rise to the top of the cell and escape. If desired, a chamber may be provided in the top part of the cell and air blown through the chamber to dilute and remove evolved hydrogen and oxygen.

If desired, a non-conducting hood 50, such as illustrated in Fig. 7, may be provided. This hood has pitched roof 52 and sides 54 but is open at the ends. Duct 42 is provided for gas removal. It rests on the graphite (see Fig. 2) and has a width equal to that of the cell unit so that the sides fit snugly against the spacers 15 and/or the cell end walls. Since the ends of the hood are open, free circulation of the electrolyte over the outer electrodes and downwardly in the cell is permitted.

The cell illustrated in the drawings may be modified without departure from the scope of the invention. Thus, other chemically resistant electrodes, such as platinum clad copper electrodes, may be used in lieu of carbon. Moreover, the end electrodes may be embedded in a cast section of a conducting metal, such as lead, instead of being anchored to the end walls by studs. In such a case, the cast sections may be coated with rubber, mastic or the like, and used as the end walls of the cells.

Although best results are attained when the electrodes are vertical, cells may be modified to provide electrodes mounted horizontally but otherwise in the same respective relationship to opposed electrodes.

Alternating current in lieu of direct current may be applied across the electrodes. In such a case, each face of the electrodes serves alternately as a cathode and an anode. Where direct current is used, the polarity of the electrodes may be reversed after the anodic face of the electrodes has worn down or the polarity may be reversed repeatedly in order to obtain uniform wear of the electrodes.

While the cell herein contemplated is especially adapted for use as a cell for production of alkali metal chlorate, it is capable of other use, such as in electrolytic oxidation of organic liquids and the like. By provision of suitable cathodic diaphragms between the electrodes in each cell unit, the cell may be used to produce elemental chlorine. Other uses will be apparent to those skilled in the art.

Although the present invention has been described with reference to the specific details of certain embodiments thereof, such details shall not be regarded as limitations upon the scope of the invention except insofar as included in the accompanying claims.

What is claimed:

1. An electrolytic cell which comprises an electrolyte chamber, groups of spaced, substantially parallel, vertically disposed lines of carbon electrode segments extending in end to end relation from one end of the chamber to the other, removable nonconducting separators between the ends of the segments preventing substantial current flow directly between adjacent segments and having opposed slots which engage the ends of adjacent segments, further groups of spaced, substantially parallel, vertically disposed lines of carbon electrode segments disposed in end to end relation from one end of the chamber to the other, a side face of each of such further group being disposed opposite and substantially parallel to a side face of a first named group of electrode segments, the ends of the electrode segments of the second groups extending beyond the ends of the electrode segments of the first groups and the side faces of said electrodes bearing against the separators of the first group and forming cell units for accommodation of electrolyte, and means to establish an electric potential between the first group and second group electrode segments.

2. An electrolytic cell which comprises an electrolyte chamber, groups of spaced, substantially parallel, vertically disposed lines of carbon electrode segments extending in end to end relation from one end of the chamber to the other, nonconducting separators between and in contact with the ends of the segments preventing substantial current flow directly between adjacent segments, further groups of spaced, substantially parallel, vertically disposed lines of carbon electrode segments disposed in end to end relation from one end of the chamber to the other, a side face of each of such further group being disposed opposite and substantially parallel to a side face of a first named group of electrode segments, the ends of the electrode segments of the second groups extending beyond the ends of the electrode segments of the first group, means to establish an electric potential between the first group and second group electrode segments, and nonconducting separators at the ends of each of the electrode segments separating the first groups of electrode segments from the second named groups of electrode segments and providing spaces for electrolyte therebetween, said separators and electrodes being removably held together by frictional engagement.

3. The cell of claim 1 wherein the separators are H-shaped in transverse cross section and the ends of the electrode segments are disposed in opposed grooves of the spacers.

4. An electrolytic cell which comprises a cell chamber, a plurality of substantially parallel lines of electrodes disposed in said chamber, each line comprising a plurality of said electrodes having vertically disposed sides and being in end to end alignment and nonconductive spacers between and in contact with adjacent electrodes in said line; said spacers having slots in opposed sides thereof which engage the ends of the aligned electrodes; immediately adjacent lines of said electrodes being so disposed that the electrodes of one line overlap, in the longitudinal direction of the line, the electrodes of the adjacent line and the spacers of such one line bear against the outer sides of the spacers of such adjacent line whereby to provide individual cell units the side walls of which are the sides of opposed adjacent electrodes and the ends of which are spacer elements; and means to establish an electric potential between adjacent electrodes.

5. The cell of claim 4 wherein the spacers are H-shaped in horizontal cross-section.

6. The cell of claim 4 wherein the electrode of one line bears against the spacer of the adjacent line at a point substantially equidistant from both ends of said electrode.

7. An electrolytic cell which comprises a cell chamber, a plurality of substantially parallel lines of electrodes disposed in said chamber, each line comprising a plurality of said electrodes having vertically disposed sides and being in end to end alignment and nonconductive spacers between and in contact with adjacent electrodes in said line, said spacers having slots in opposed sides thereof which engage the ends of the aligned electrodes; immediately adjacent lines of said electrodes being so disposed that the electrodes of one line overlap, in the longitudinal direction of the line, the electrodes of the adjacent line and the spacers of such one line bear against the outer sides of the spacers of such adjacent line whereby to provide cell units the side walls of which are the sides of opposed adjacent electrodes and the ends of which are spacer elements; and means to establish an electric potential between adjacent electrodes; said spacers and electrodes being removable from each other and being held together by frictional engagement whereby to form a unitary cell structure comprising a plurality of said cell units.

8. An electrolytic cell which comprises a cell chamber, a plurality of spaced substantially parallel lines of electrodes disposed in said chamber; each line comprising a plurality of said electrodes having vertically disposed sides and being in end to end relation and nonconductive spacers between the electrodes and in contact with ends of the adjacent electrodes in said line isolating the adjacent electrodes of said line; immediately adjacent lines of said electrodes being so disposed that the electrodes of one line overlap, in the longitudinal direction of the line, the electrodes of the adjacent line; the spacers in contact with the ends of the electrodes on one line bearing against the sides of the electrodes of the immediate lines thereby partitioning the spaces between the electrode lines into a successive series of a plurality of separate elongated substantially parallel cell units in which the units of each series are largely isolated from each other.

9. An electrolytic cell which comprises a cell chamber, a plurality of spaced substantially parallel lines of electrodes disposed in said chamber; each line comprising a plurality of said electrodes having vertically disposed sides and being in end to end relation and nonconductive spacers between the electrodes and in contact with ends of the adjacent electrodes in said line isolating the adjacent electrodes of said line; immediately adjacent lines of said electrodes being so disposed that the electrodes of one line overlap, in the longitudinal direction of the line, the electrodes of the adjacent line; the spacers in contact with the ends of the electrodes on one line bearing against the sides of the electrodes of the immediate lines thereby partitioning the spaces between the electrode lines into a successive series of a plurality of separate elongated substantially parallel cell units in which the units of each series are largely isolated from each other; and supports in the lower portion of the cell for holding the electrodes a substantial distance above the bottom thereof and to provide a space for sludge.

10. An electrolytic cell which comprises a cell chamber having nonconducting walls, a plurality of spaced substantially parallel lines of electrodes disposed in said chamber and spaced from and running along one of said walls whereby to provide spaces for electrolyte between the lines and other spaces for electrolyte between the wall and the line nearest said wall; each line comprising a plurality of said electrodes having vertically disposed sides and being in end to end alignment and nonconductive spacers between and in contact with adjacent electrodes in said line; said spacers having slots in opposed sides thereof which engage the ends of the aligned electrodes; immediately adjacent lines of said electrodes being so disposed that the electrodes of one line overlap, in the longitudinal direction of the line, the electrodes of the adjacent line and the spacers of such one line bear against the outer sides of the spacers of such adjacent line whereby to provide individual cell units the side walls of which are the sides of opposed adjacent electrodes and the ends of which are spacer elements; and means to establish an electric potential between adjacent electrodes.

References Cited in the file of this patent

UNITED STATES PATENTS

| | | |
|---|---|---|
| 832,983 | Kother | Oct. 9, 1906 |
| 1,815,080 | Smith | July 21, 1931 |

FOREIGN PATENTS

| | | |
|---|---|---|
| 454,734 | Canada | Feb. 22, 1949 |
| 14,463 | Great Britain | of 1900 |
| 8,580 | Sweden | Sept. 19, 1896 |
| 467,992 | Canada | Sept. 12, 1950 |